May 11, 1965  M. GOLDINE  3,182,550
TAXICAB ADVERTISING DEVICE
Filed July 30, 1962  3 Sheets-Sheet 1

MATHEW GOLDINE
INVENTOR.

BY Albert M. Herzig
ATTORNEY

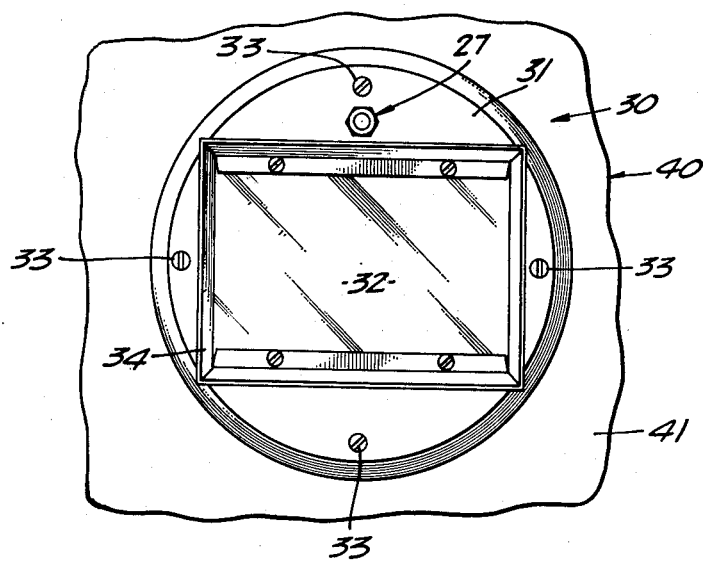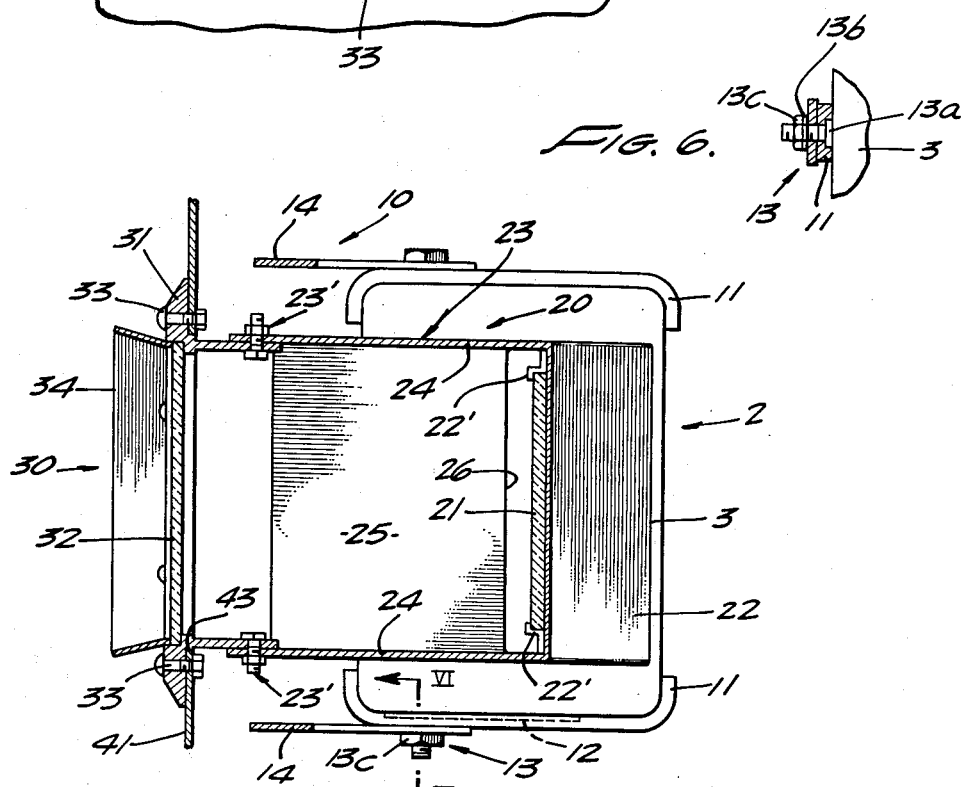

May 11, 1965        M. GOLDINE        3,182,550

TAXICAB ADVERTISING DEVICE

Filed July 30, 1962        3 Sheets-Sheet 3

MATHEW GOLDINE
INVENTOR.

BY *Albert M. Herzig*

ATTORNEY

United States Patent Office 3,182,550
Patented May 11, 1965

3,182,550
TAXICAB ADVERTISING DEVICE
Mathew Goldine, 1409 Cholla Way, Las Vegas, Nev.
Filed July 30, 1962, Ser. No. 213,172
5 Claims. (Cl. 88—24)

In general, the present invention relates to a taxicab advertising device which is adapted to be easily installed in a wide variety of taxicab body constructions to be readily accessible when installed and to be operated in conjunction with the taxicab meter. More particularly, the present invention relates to a simple, adjustable taxicab advertising device connected to the dashboard of the taxicab and adapted to be easily viewed by passengers in both the front and rear seats of the taxicab.

One of the basic problems in the field of advertising has been the obtaining of the maximum exposure of the largest number of potential customers to the advertising message which the advertising seeks to convey. Intimately related with such problem is the practical requirement that such exposure be obtained at a minimum cost and that there be some assurance that the potential customer give the advertising message at least a minimum amount of attention and not ignore it completely. Among the many advertising devices which have sought to achieve a satisfactory resolution of these advertising problems have been signs posted in public transportation vehicles, such as busses and taxicabs. Such signs obviously have the advantage of a large exposure to potential customers because of the many passengers which will have the opportunity to observe the advertising message in the sign. However, in the past, the use of signs in taxicabs has encountered a number of problems. Perhaps the single most important problem has been the very limited space available for signs within a taxicab, so that it was customary in the past to compromise between a few, large signs which were easy to read and observe, e.g. two to four signs or a fair number of smaller signs which required some effort and attention to read and observe, e.g. ten to twelve signs. In addition, the advertising signs previously used in taxicabs were also relatively inefficient in inviting the passengers' concentration. For example, having a number of stationary signs inexorably means that the passenger's attention was divided and that the signs once observed would be ignored and no longer invite attention. Also, since the prior art advertising signs in taxicabs were permanent, this meant that for a large portion of the time, e.g. when the taxicab was not in use, the advertising message was being presented, but no potential customers were being exposed to it.

Consequently, an object of the present invention is a taxicab advertising device which inexpensively brings a large number of signs to the attention of the passengers at minimum expense.

Another object of the present invention is a taxicab advertising device adapted to attract maximum attention to the advertising signs and to invite concentration thereon with respect thereto.

Still another object of the present invention is a taxicab advertising device adapted to repeatedly attract the passengers' attention to a large number of advertising signs.

Still another object of the present invention is a taxicab advertising device which is adapted to operate only when paying passengers are in the taxicab so that expenses are incurred only when the advertising signs are actually being presented to an audience.

Still another object of the present invention is a simple, adjustable taxicab advertising device adapted to be easily installed in a wide variety of taxicab body constructions and which is readily accessible when installed.

Other objects and advantages of the present invention will be readily apparent from the following description and drawings which illustrate exemplary embodiments of the present invention.

In general, the present invention involves a taxicab advertising device comprising a projector means adjustably mounted under the dashboard of a taxicab for casting in sequence images of a series of advertising messages. The period of operation of such projector means is controlled by the taxicab meter to coincide with the period of operation of the taxicab meter. Mounted on the dashboard of the taxicab is a screen means for receiving the images from said projector means. The screen means is positioned to be easily viewed by passengers in both the front and rear seats of the taxicab. The dashboard of the taxicab has an aperture therethrough adapted to permit the images to be received on said screen means from the projector means. Preferably, the taxicab advertising device of the present invention also includes a mirror means adapted to receive the images from the projector means and to reflect such images on to said screen means.

In order to facilitate understanding of the present invention, reference will now be made to the appended drawings of specific embodiments of the present invention. Such drawings should not be construed as limiting the invention which is properly set forth in the appended claims.

In the drawings:

FIG. 2 is a front view of the specific embodiment shown in FIG. 1 taken along the line II—II of FIG. 1.

FIG. 3 is a cross-sectional view of FIG. 1 taken along the lines III—III of FIG. 1.

FIG. 6 is a cross-sectional view of FIG. 3 taken along the lines VI—VI of FIG. 3.

Figures 1, 5:
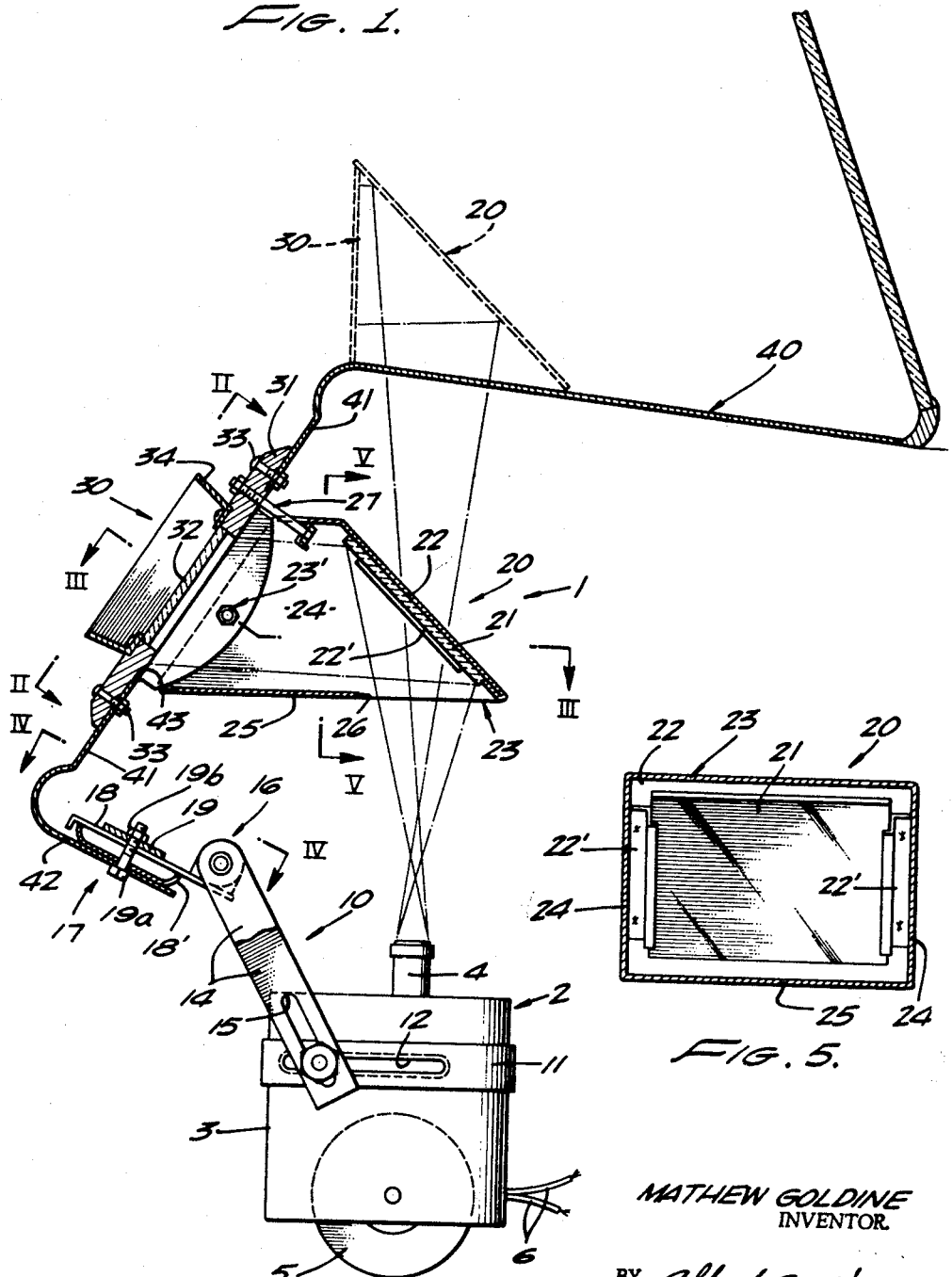
FIG. 1 is a partly cross-sectional view of the preferred specific embodiment of the advertising device of the present invention when installed in a taxicab.
FIG. 5 is a cross-sectional view of FIG. 1 taken along the lines V—V of FIG. 1.
Figure 4:
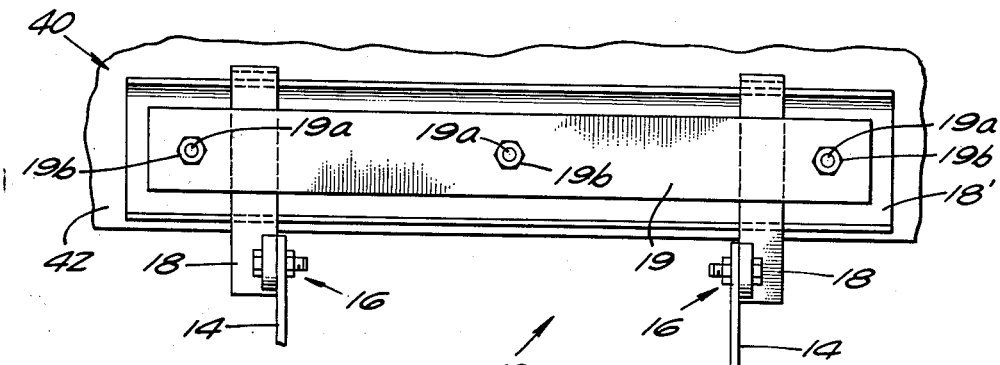
FIG. 4 is a cross-sectional view of FIG. 1 taken along the lines IV—IV of FIG. 1.

In FIGS. 1–6, the taxicab advertising device, generally indicated as 1, includes a projector means 2 for casting in sequence images of a series of advertising messages; a mirror means 20 adapted to receive the images from said projector means and to reflect said images on to a screen means 30 which receives them. Projector means 2 includes a projection machine 3 having a lens system 4. Projection machine 3 is adapted to receive a film magazine 5 which preferably runs continuously while the projection machine is in operation. Alternatively, a projection machine 3 may be adapted to run the film from the magazine 5 and then automatically rewind it. On the film in the film magazine 5 may be a series of signs in sequence for a predetermined time period for each sign, a motion picture, animated cartoons or some other pictorial representation. Such pictorial representation is preferably accompanied by sound effects produced by a speaker (not shown) connected to the projection machine 3 or may be silent. These features of projection means 3 are standard features on conventional projecting machines and are not of themselves part of the present invention. Projection machine 3 receives its power through electrical conduits 6 which are connected to the taxicab meter (not shown) and to the taxicab electrical power system (not shown). Conventional switching means in the taxicab meter supplies power to the projection machine only during the period of operation of the taxicab meter, i.e. when the meter flag is down. Consequently, the period of operation of the projector means 2 is controlled by the taxicab meter.

The projector means 2 is adjustably mounted under the dashboard 40 by adjustable bracket means 10. The adjustable bracket means 10 is adapted to position the projector means 2 in a range of positions from a position adjacent to the angular portion 41 of the taxicab dashboard 40 and just below the taxicab dashboard to a position remote from the angular portion 41 of the taxicab dashboard 40 and far below the taxicab dashboard. Bracket means 10 includes bands 11 which securely grasp projection machine 3 and which have slots 12 therein along the sides of the projection machine 3. A fastening means 13 including a stud 13a attached to the projection machine 3, a washer 13b and nut 13c connects projection machine 3 to bands 11 and arms 14. The fastening means 13 is slidably received in slot 12 and fastens the bands 11 to articulated arms 14. Arms 14 in turn have slots 15 therein in which fastening means 13 are also slidably mounted so that the relationship between arms 14 and bands 11 may be varied to position projection machine 3 over a wide range of positions. Articulated arms 14 are in turn rotatably connected to the bottom 42 of the dashboard 40 by hinges 16 mounted on a spring connector 17. Spring connector 17 insures that the projection machine 3 is securely attached to the dashboard 40 while damping out any vibrations which may be transmitted from dashboard 40 to the projector machine 3. Spring connector 17 includes ribs 18 supporting adjustable connection 16 and secured to clamp 18' by a bar 19 and bolts and nuts 19a and 19b, respectively.

The image cast by the projector means 2 is received by a mirror means 20 so that the direction of the light rays forming the image is changed and the distance over which such rays travel is substantially increased to produce a larger image. Mirror means 20 includes a mirror 21 mounted on a support means 22 by brackets 22'. A hood means 23 attaches support means 22 to the angular portion 41 of the dashboard 40 by means of adjustable connections 23'. Hood means 23 encloses the space between the mirror means 20 and the dashboard 40 by side panels 24 and a bottom panel 25 except for an opening 26 adapted to receive the image cast by the projector means 2. Thus hood means 23 protects such space from interfering light. The support means 22 for the mirror means 20 is adjustably attached to the dashboard 40 by fastening means 27 adapted to permit the mirror means to be moved with respect to the dashboard 40 to properly reflect the image cast by the projector means 2.

The image reflected by mirror means 20 is received on a screen means 30 mounted on the angular portion 41 of dashboard 40 of the taxicab. Screen means 30 is positioned to be easily viewed by passengers in both the front and rear seats of the taxicab. The dashboard 40 has an aperture 43 therethrough adapted to permit said images to be received on the screen means from the projector means. Preferably, screen means 30 is mounted in the taxicab dashboard 40 to avoid any interference with the field of vision of the taxicab driver. Screen means 30 includes a mounting plate 31 in which is set a ground glass screen 32. The mounting 31 and ground glass screen 32 are removably mounted by connector means 33 on the taxicab dashboard 40 to permit ready access to the projector means through the dashboard aperture 43. Preferably, the mirror means 20 is connected to the mounting plate 31 so that when the screen means 30 is removed the mirror means 20 is also removed. The screen means 30 also preferably includes a shield means 34 surrounding the ground glass screen 32 which is adapted to protect the screen 32 from interfering light.

Figure 7:
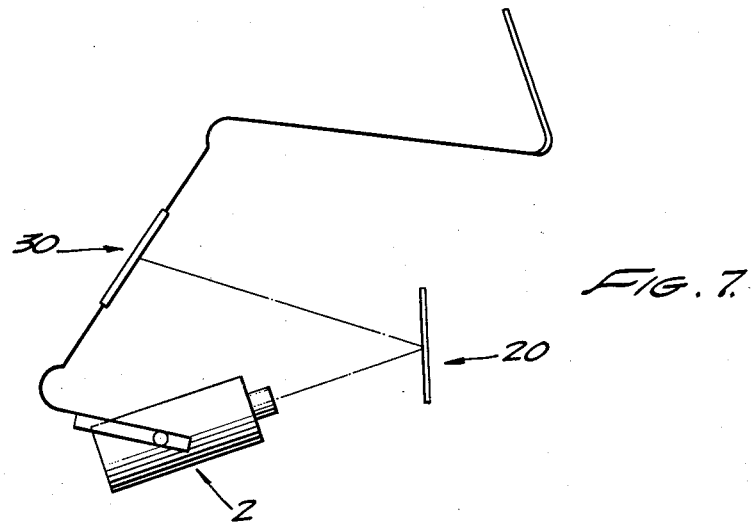
FIG. 7 is a schematic side view of another embodiment of the taxicab advertising device of the present invention when installed in a taxicab.
Figure 8:
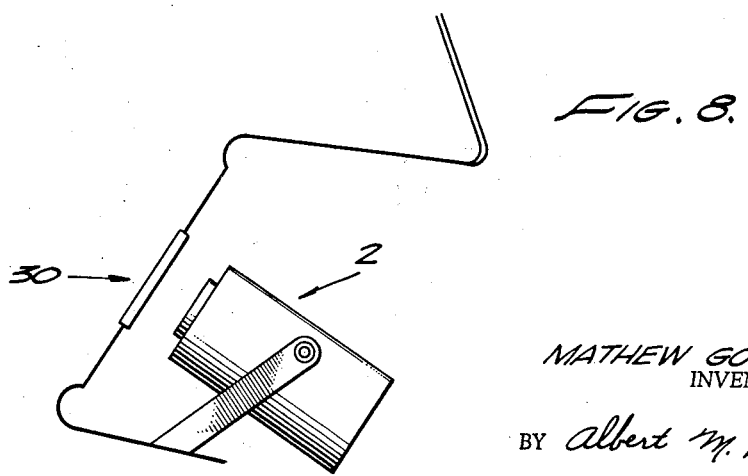
FIG. 8 is a schematic side view of another embodiment of the present invention when installed in a taxicab.

As indicated schematically in outline form in FIG. 1, the screen means 30 and the mirror means 20 may be mounted above the taxicab dashboard to improve the view of the passenger in the rear seat of the taxicab. As schematically indicated in FIG. 7, another variation of the present invention would involve positioning the mirror means 20 substantially beneath the taxicab windshield, with the projector means 2 substantially beneath the angular portion 41 of the dashboard 40. In this way, the distance travelled by the image is substantially increased so that the size of the image received on the screen may be substantially increased. Also, the projector means is more readily accessible from the front seat of the taxicab. Still another variation of the present invention is schematically indicated in FIG. 8 wherein the projector means 2 is positioned directly behind the angular portion 41 of the dashboard 40 and casts its image directly upon the screen means 30. With this arrangement, the need for a mirror means is eliminated and along with the possibility of a projector means interfering with a passenger riding in the front seat of the taxicab. If desired, the projector means and screen means may be formed into a single integral unit.

On installation in a taxicab, the operation of the advertising device of the present invention is quite simple. A reel of film consisting of the desired pictorial representation is mounted in the projector means in the conventional fashion. Subsequently, when a paying passenger enters a taxicab, the taxicab meter operation is initiated and the projector means of the advertising device is also started.

The pictorial representations are then cast upon the screen means of the present invention with the result that the passenger's attention is directed thereto. Preferably, such pictorial representations are shown in color with sound effects so that they invite the passenger's attention thereto similarly as a television set invites attention. After the series of pictorial representations has been run through, the same cycle is repeated so that the passenger's attention is continually invited thereto in his anticipation of seeing the next advertising message.

Many modifications and variations of the present invention will be obvious to one skilled in the art in view of the preceding disclosure. For example, if desired, a hood means may be enclosed in the space between the projector means and mirror means to improve the clarity of the image received upon the screen means. Also, the aforementioned hood and shield need not completely close or surround the space that they are designed to protect, since adequate protection may be received from the taxicab body itself or other parts of the taxicab.

There are many features in the present invention which clearly show the significant advance the present invention represents over the prior art. Consequently, only a few of the more outstanding features will be pointed out to illustrate the unexpected and unusual results attained by the present invention.

One feature of the present invention is that it presents a large number of advertising messages to taxicab passengers so that each message receive a maximum amount of attention.

Another feature of the present invention is that such advertising messages are presented in vivid projected images and are continually changed in re-cycles so that attention is revived with each of change of message.

Another feature of the present invention is that the advertising device operates only when there are paying passengers in the taxicab, being operated in conjunction with the taxicab meter so that the advertising message is being presented only when potential customers are there to receive it.

Still another feature of the present invention is an advertising device which is simple, adjustable, and easily installed in a wide variety of taxicab body constructions and also is readily accessible when installed. Thus the advertising device of the present invention may be installed in substantially all of the taxicabs presently in operation and can easily be serviced when in operation. For example, to change the advertising messages presented, one merely need replace the reel of film which is being used. Further, the screen and mirror means are removable from the dashboard so that the projector may be serviced from various different angles.

Another feature of the present invention is the fact that the mirror means may cooperate with the projector means in a variety of cooperative positions so that the image received by the screen can be changed, if desired, and the projector may be located in any convenient position.

It will be understood that the foregoing specification and drawings are only illustrative of the present invention and it is not intended that the invention be limited thereto. Many other specific embodiments of the present invention will be obvious to one skilled in the art in view of this disclosure. All substitutions, alterations and modifications of the present invention which come within the scope of the following claims or to which the present invention is readily susceptible without departing from the spirit and scope of this disclosure are considered part of the present invention.

I claim:

1. A simple, adjustable taxicab advertising device adapted to be easily installed in a wide variety of taxicab body constructions, to be readily accessible when installed and resistant to vibrations of the taxicab body, comprising:

(a) projector means independently and adjustably mounted under the dashboard of a taxicab for casting in sequence images of a series of advertising messages, said mounting comprising adjustable bracket means adapted to position said projector means in a range from about adjacent to the vertical portion of the taxicab dashboard and just below the taxicab dashboard to remote from the vertical portion of the taxicab dashboard and far below the taxicab dashboard and spring connector means adapted to adjustably support said bracket means on said taxicab dashboard and to damp out the vibrations of said taxicab dashboard which may be transmitted from said taxicab dashboard to said projector means; and (b) screen means mounted on the taxicab dashboard for receiving said images, said screen means being positioned to be easily viewed by passengers in both the front and rear seats of the taxicab.

2. A taxicab advertising device as stated in claim 1 which includes a mirror means adapted to receive the images from said projector means and to reflect said images on to said screen means.

3. A taxicab advertising device as stated in claim 1 wherein said screen means is removably mounted on the taxicab dashboard to permit ready access to the projector means through the dashboard aperture.

4. A taxicab advertising device as stated in claim 1 wherein said bracket means comprises a pair of bands adapted to securely grasp said projector means, each of said bands having a longitudinal slot therein; a pair of articulated arms adjustably mounted on said spring connector means, each of said arms having a longitudinal slot therein and being positioned adjoining a corresponding band; and fastening means connecting each arm and band and being slidably mounted in their slots.

5. A taxicab advertising device as stated in claim 1 wherein said spring connector means comprises a flexible U-shaped clamp mounted on said taxicab dashboard; a pair of ribs slidably mounted on said clamp and extending laterally to said clamp, said ribs supporting said bracket means; and a longitudinally extending bar securing said ribs to said clamp.

References Cited by the Examiner

UNITED STATES PATENTS

| | | | |
|---|---|---|---|
| 947,058 | 1/10 | Duncan | 88—24 |
| 1,572,671 | 2/26 | Myers | 88—24 |
| 1,684,968 | 9/28 | Owens. | |
| 1,973,982 | 9/34 | Haek et al. | |
| 2,880,646 | 4/59 | Brothers | 88—24 |
| 3,062,097 | 11/62 | Hutterer | 88—24 |

NORTON ANSHER, *Primary Examiner.*

WILLIAM MISIEK, *Examiner.*